United States Patent [19]

Johannisson, deceased et al.

[11] 4,082,261
[45] Apr. 4, 1978

[54] MACHINE FOR THE MANUFACTURE OF OBJECTS OF SHEET SHAPE

[75] Inventors: Tor Gustav Alberto Johannisson, deceased, late of Lysekil, Sweden, by Maj-Britt Johannisson, heir-at-law; by Tom G. Johannisson, heir-at-law

[73] Assignee: Flodins Industri AB, Lysekil, Sweden

[21] Appl. No.: 661,501

[22] Filed: Feb. 26, 1976

[30] Foreign Application Priority Data

Feb. 26, 1975 Sweden .................................. 7502134

[51] Int. Cl.² ........................ B65H 29/16; B65H 29/32
[52] U.S. Cl. ............................... 271/69; 83/152; 83/277; 214/6 FS; 226/150; 226/162; 271/84; 271/194
[58] Field of Search ............... 271/194, 85, 84, 69, 271/200; 83/277, 152, 153, 276, 94, 155.1; 226/171, 150, 162; 214/6 FS, 1 BT

[56] References Cited

U.S. PATENT DOCUMENTS

| | | | |
|---|---|---|---|
| 1,041,439 | 10/1912 | Dearborn | 271/200 UX |
| 2,413,553 | 12/1946 | Evers | 271/194 X |
| 3,199,448 | 8/1965 | Jaffa et al. | 226/162 X |
| 3,222,971 | 12/1965 | Gerletz | 83/277 X |
| 3,330,092 | 7/1967 | Hill | 83/152 X |
| 3,701,299 | 10/1972 | Stumpf | 83/277 X |
| 3,888,359 | 6/1975 | Moline | 271/194 X |

Primary Examiner—Bruce H. Stoner, Jr.

[57] ABSTRACT

A machine for the manufacture of objects of sheet shape being removed from the output end of said machine by means of a taking-off device. Said device is connected with a feeding device for said objects. The feeding device is arranged to perform a reciprocating movement and the taking-off device is arranged to follow the same in its motion.

3 Claims, 11 Drawing Figures

MACHINE FOR THE MANUFACTURE OF OBJECTS OF SHEET SHAPE

The present invention relates to a machine for the manufacture of objects of sheet shape from foil webs and comprising a number of foil processing devices, a conveyor, on which the foil webs are arranged to be supported and fed in forwards direction, a feeding device with substantially reciprocating movement for a stepwise forward feed of the objects, and a taking-off device serving the purpose to remove the objects from the conveyor.

It is an object of the present invention to provide a machine for the manufacture of objects of sheet shape, which is reliable in operation and works with precision and has a great capacity.

Said objects are reached by means of the machine according to the present invention, which is characterized by the taking-off device being located at the output end of the conveyor and arranged to displace itself between a clamping position on the conveyor band and a delivery position outside its output end and by the taking-off device being connected to the forward feeding device and arranged to follow the same in its movement.

Figure 1:
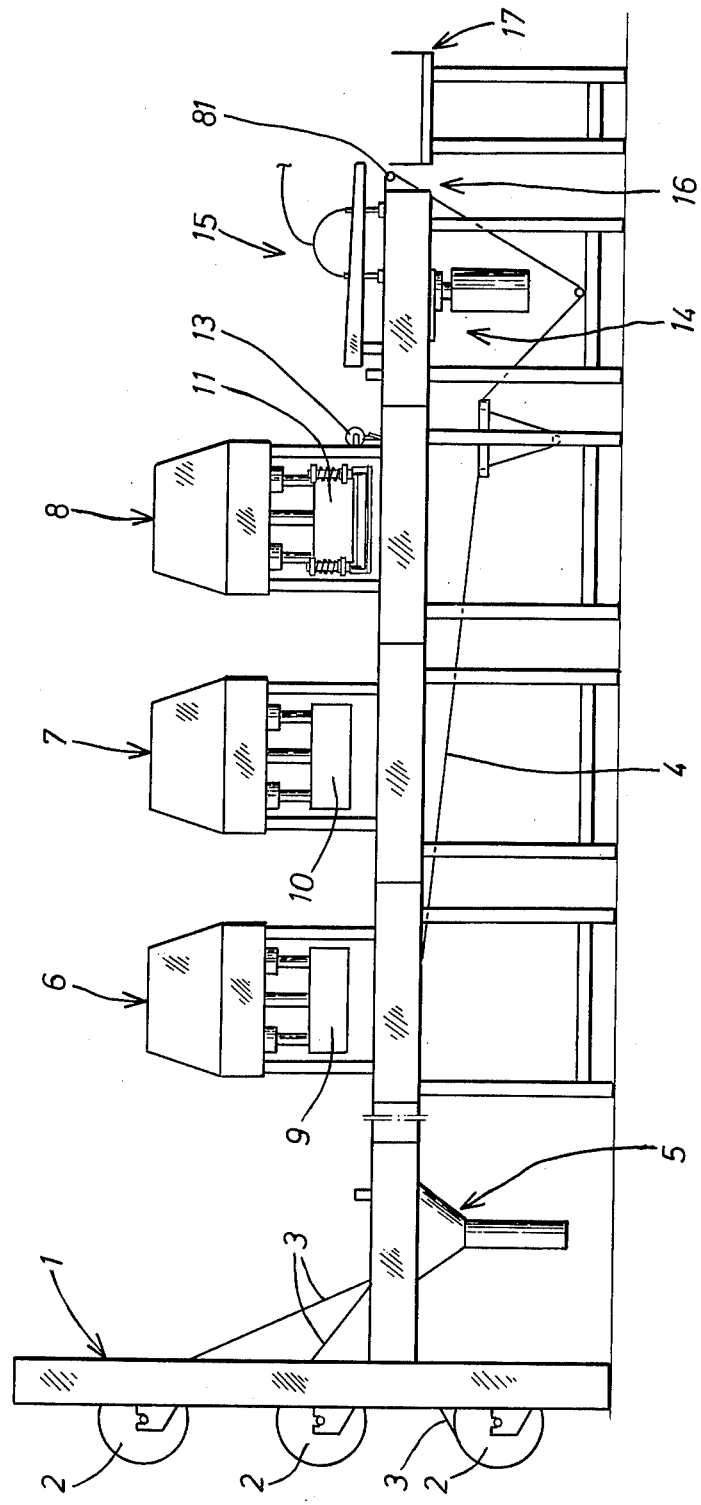
Figure 2:
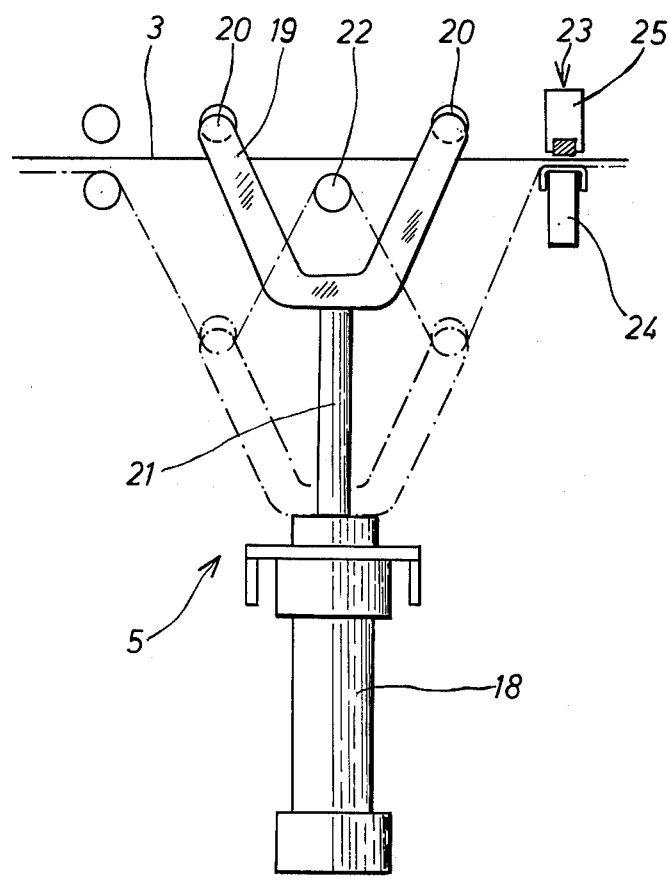
Figure 3:
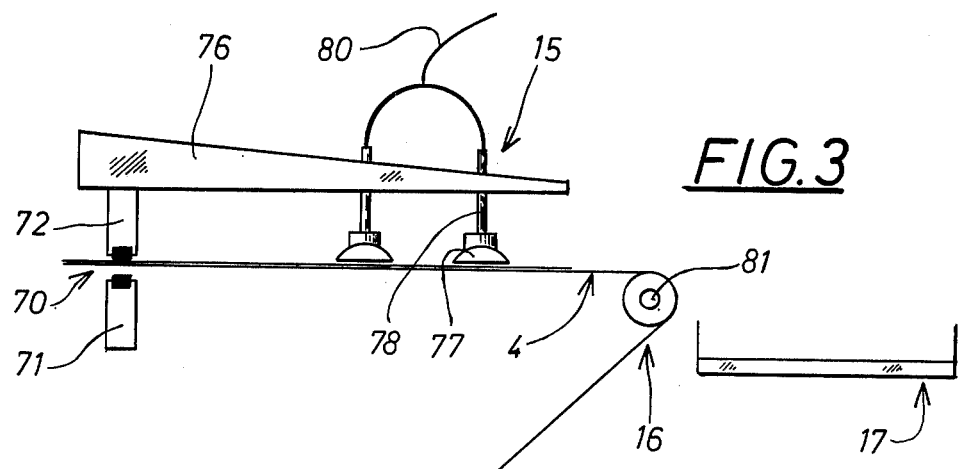
Figure 4:
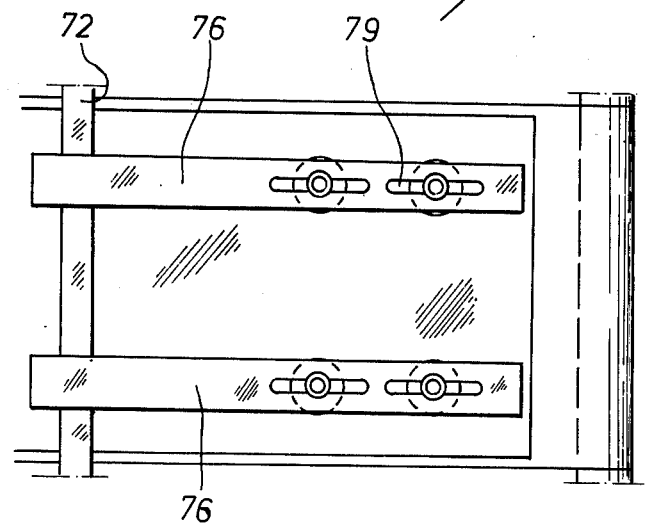
Figure 7:
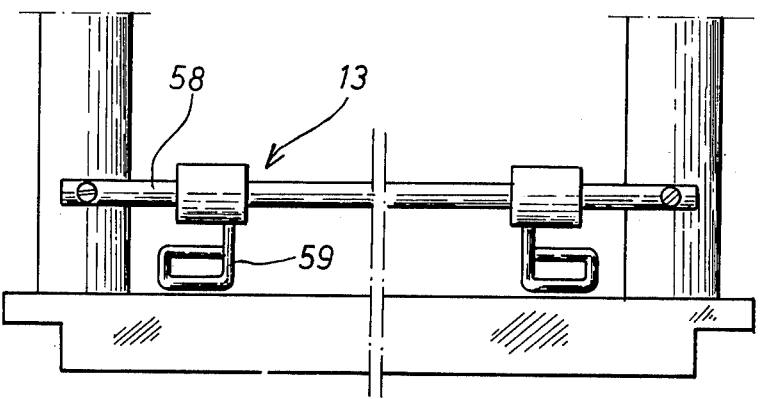
Figure 5:
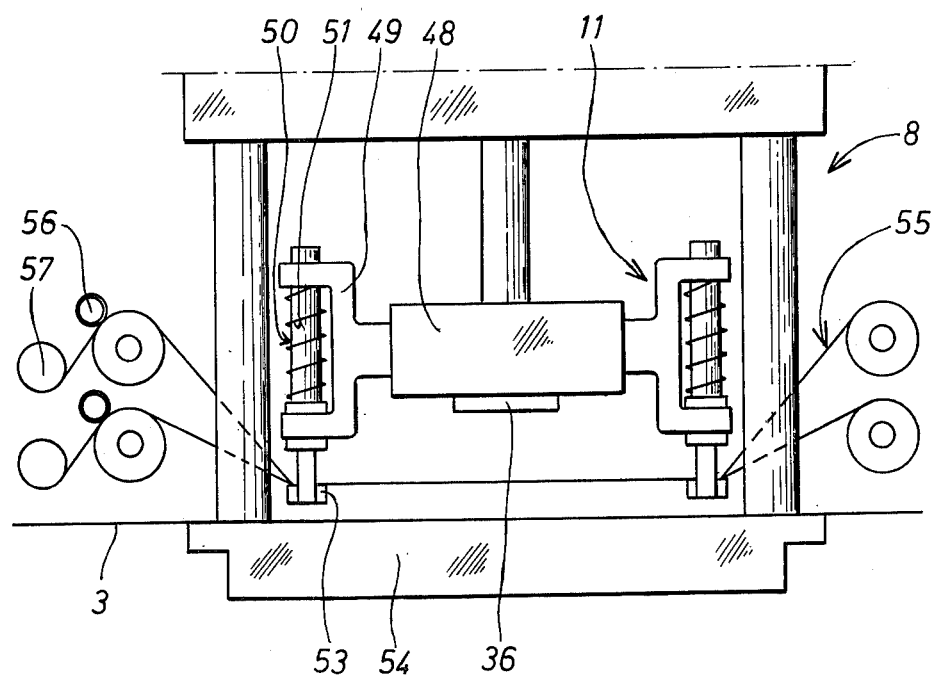
Figure 6:
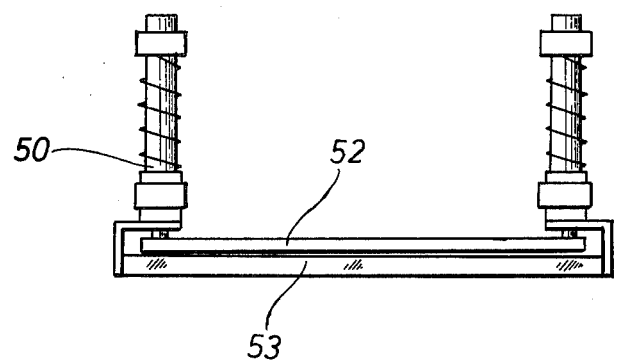
Figure 8:
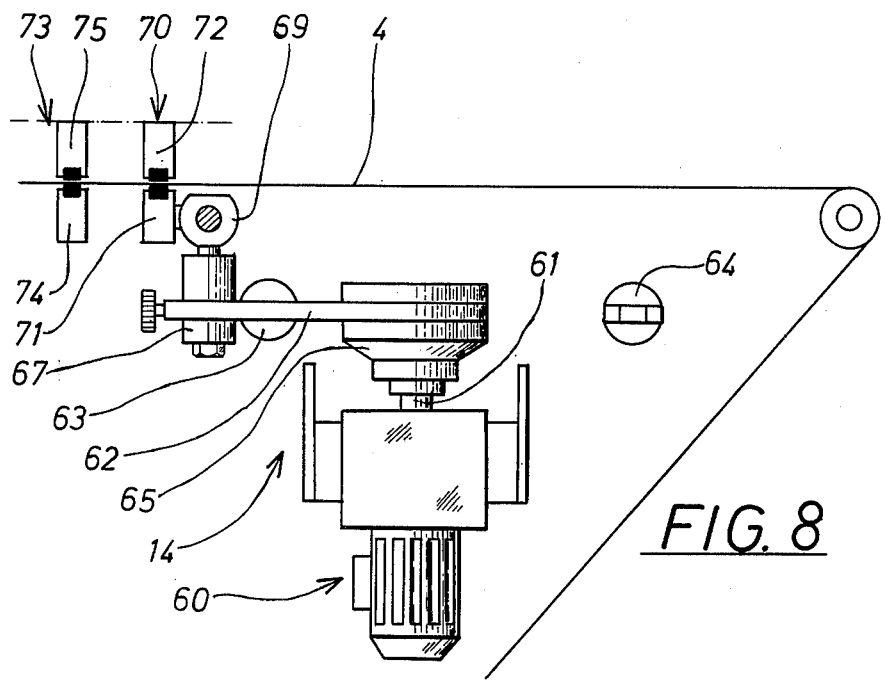
Figure 9:
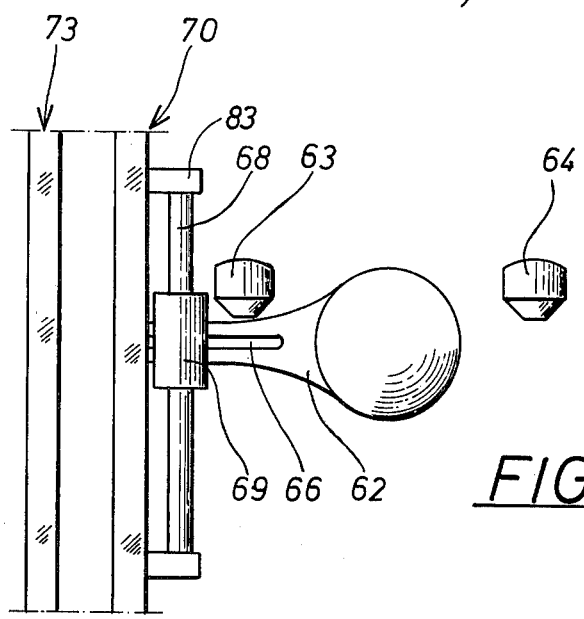
Figure 10:
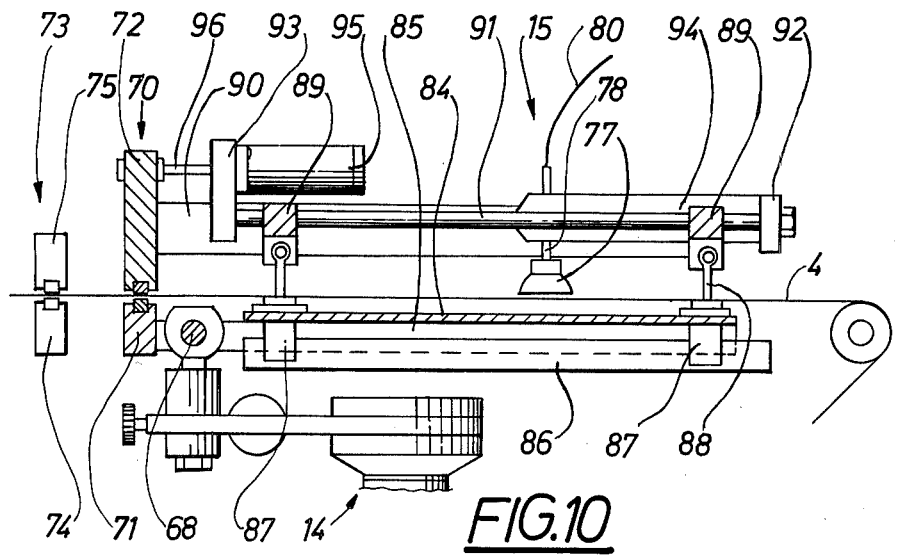
Figure 11:
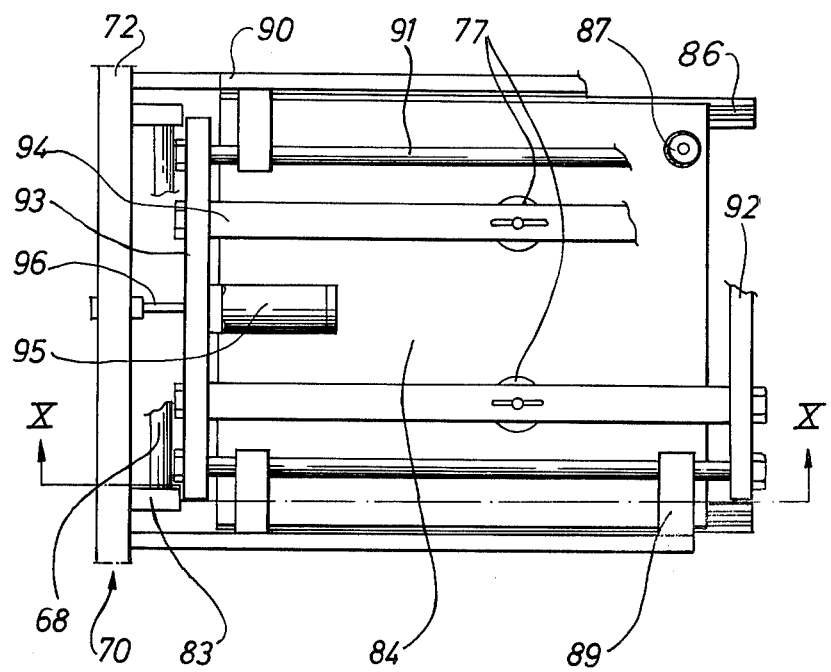

The invention will now be described more in detail in the following by means of an example of embodiment, reference being made to the accompanying drawings, in which FIG. 1 schematically illustrates a machine for the manufacture of objects of sheet shape, FIG. 2 shows a device for unrolling of foil webs from a number of storage rollers, FIGS. 3 and 4 illustrate a first embodiment of a taking-off device for the finished sheet shaped objects, FIGS. 5 and 6 illustrate a clamping device forming part of one of the foil treating devices of the machine, FIG. 7 shows a device for removing edge waste from the foil webs, FIGS. 8 and 9 show a feeding device for the foil webs, while FIGS. 10 and 11 illustrate the taking-off device for the finished sheet shaped object in a second embodiment. In this connection figure 10 shows a side elevational view partly broken along the line X—X in FIG. 11 and comparable with the view of FIG. 8. FIG. 11 shows a top view comparable with the view of FIG. 9.

The machine schematically illustrated in FIG. 1 by way of example comprises a so called plastics welding machine, which is intended for the manufacture of products of plastic foil from a number of foil webs. The products can for example be photo-pockets comprising two or several layers of plastic foil, which are welded together and cut out of the foil webs and in its case provided with for example printed letters in the form of raised letters usually in colour print.

The illustrated plastics welding machine substantially is comprised by the following devices schematically illustrated in FIG. 1.

At one end of the machine there is a roller stand 1, in which a number of storage rollers 2 with plastic foil are rotatably mounted, from which rollers under operating conditions foil webs 3 are successively unrolled and fed through the machine, one layer lying against the other and being supported by a conveyor in the form of an endless band 4. Moreover an unrolling device 5 in order to cause a successive unrolling of the foil webs 3 from their storage rollers 2 forms part of the assembly of the machine. In order to treat the plastic foil 3 converting it into a finished product, there are a number (in the illustrated example three) foil treating devices 6, 7, 8, which comprise a welding press 6, a cutting press 7 and an embossing press 8.

By means of the welding press 6 thus for example two of the foil webs 3 are welded together according to a certain pattern depending upon the appearance of the finished product. This is carried out by means of a welding block 9 carrying out a reciprocating movement relative to the foil webs 3 and by way of example being of the high frequency type.

By means of the cutting press 7, which for example is a so called hot cutting press, the products are cut out of the foil webs by means of a hollow punch 10, which likewise carries out a reciprocating movement and by means of its knives forming part of the tool cut through the foil webs in combination with a heating action of comparatively high temperature, for example 100°–200° C. A fixed table can suitably serve the purpose of a cushion, said table being clad with a cover of rubber or similar, which takes up possible differences in height of different parts of the cutting edges of the tool.

By means of the embossing press 8 the foil products are provided for example with printed letters, suitably in colours, said letters being provided in the form of separate coloured foil webs, which will be described more in detail below. In order to secure that the foil webs are kept in a stretched condition during the embossing procedure and at the return stroke of the press, this is provided with a clamping device 11, the design of which will be described more in detail below with reference to the FIGS. 5 and 6. The embossing press 8 like the two other presses 6, 7 is driven with a reciprocating movement, which is provided by means of a power generating device, which by way of example comprises a hydraulically or pneumatically operated piston cylinder units. In the direction of feed counted after the embossing press 8 a device 13 for the removal of edge waste is arranged, the design of which will be described more in detail by means of an example with reference to the FIG. 7.

The feed of the foil webs 3 on the conveyor band 4 is carried out in steps, thereby moving the foil webs a distance of an advancing step of the foil webs substatially corresponding to the extension of a product in the feed direction or a multiple thereof. This feed is provided by means of a feed mechanism 14, the design of which will be described more in detail below with an example with reference to the FIGS. 8 and 9.

The machine according to the invention further comprises a taking-off device 15, which is located at the outlet end 16 of the machine and is arranged to take-off the finished products from the conveyor band 4 and pile them in a hopper 17.

The unrolling device 5 illustrated in FIG. 2 thus is intended by successive unrolling of the foil webs 3 from their storage rollers to impede that any tension worth mentioning exists in the foil webs 3 while they are fed through the presses 6, 7, 8 on the conveyor band 4. The unrolling device 5 in the example shown is designed with a piston cylinder unit 18, for example pneumatically driven. The extreme end of the piston rod is equipped with a fork shaped stand 19 for two rollers 20 extending across and above foil webs 3, said rollers thus being movable together with the piston rod 21 between the position illustrated with a continuous line and the one indicated with a dashed and dotted line. The device further comprises a fixed roller 22, which is rotatably mounted in the frame of the machine and likewise extends across the foil webs 3, but below the same, in FIG. 2 a clamping device 23 is also shown, which is intended to cooperate with the unrolling device 5 and substantially comprises a fixed clamping piece 24 located across the foil webs 3 and below the same, and a movable clamping piece 25 located right in front of the fixed clamping piece but above the foil webs. The upper clamping piece 25 is moveable between a releasing position, which is illustrated in the figure, and a position, in which the foil webs are clamped.

As already mentioned above the embossing press is provided with a clamping device 11 (FIGS. 5, 6), which comprises two supporting yokes 49 positioned on the embossing head 48 and together with this movable in a reciprocating movement, in which yokes two piston cylinder units 50 are suspended by means of helical springs 51. Between the ends of the piston rods of the piston cylinders 50 extends an upper clamping rule 52 mounted on the same. Between the two piston cylinders 50 also a lower rule 53 is extending, which is rigidly connected with their cylinder housing. As is evident from FIG. 5 the foil webs 3 extend between the lower rule 53 and an embossing table 54 serving the purpose of a cushion, while colorfoil webs 55 extend through the interspace between the upper clamping rule 52 and the lower clamping rule 53 and are driven separately by means of motor driven feed rollers 56 and wound up on waste collection rollers 57, which suitably are driven via a sliding clutch.

The device 13, illustrated in FIG. 7 and serving the purpose to remove edge waste, substantially comprises two wire loops 59 displaceably attached to a crosswise oriented bar 58, through which loops the edge waste is brought to pass in order to be collected at the underside of the conveyor band 4.

The feeding device 14 substantially illustrated in the FIGS. 8 and 9 comprises a driving means 60 in the form of an electric motor arranged to produce a reciprocating pivoting movement of an output shaft 61, so that a swinging arm 62 mounted on said shaft is given a reciprocating movement over a sector defined by two stops 63, 64, in the example shown being about half a revolution. In order that the turning moment shall not be infinitely great in the stopping movement, a sliding clutch 65 has been provided between the output shaft 61 and the swinging arm 62. Via a radial bearing 67, movable in a slit 66 in the swinging arm 62, and a thrust bearing 69, displaceable along a bar 68, a liner reciprocating movement of a movable clamping device 70 connected with the bar is provided. Said clamping device comprises substantially a lower clamping piece 71 extending across the conveyor band below the same, and an upper clamping piece 72 extending right in front of the lower clamping piece above the conveyor band 4. The lower clamping piece 71 is by means of brackets 83 (see FIG. 11) connected with the bar 68 and thus is in driving connection with the feeding device 14. The upper clamping piece 72 in its turn is connected with the clamping piece 71 and thus also this clamping piece is connected with the feeding device 14. However, the upper clamping piece 72 by means of piston cylinder units controlled by means of a pressure medium can be displaced in vertical direction between a releasing position and a clamping position related to the conveyor band. Thus, it exhibits a possibility of movement in vertical direction relative to the clamping piece 71. (See also the description to the FIGS. 10 and 11). Moreover, the feeding device 14 comprises a fixed clamping device 73 cooperating with the moveable clamping device 70, said clamping device 73 likewise comprising a lower clamping piece 74 and an upper clamping piece 75, which can be vertically displaced by means of piston cylinder units (not shown) controlled by means of a pressure medium. The clamping device 73 is not equipped with devices for movement in horizontal direction.

In the FIGS. 3 and 4 the taking-off device 15 is shown according to a first embodiment, it being intended to remove the finished products from the conveyor band 4, and deposit them in the hopper 17. As is evident from the figures the taking-off device 15 is provided with two arms 76 extending in the feeding direction, said arms being rigidly connected with the vertically displaceable clamping piece 72 of the clamping device 70, said taking-off device thus being arranged to perform the same movement as the clamping piece 72. The taking-off device 15 thus substantially comprises holding organs 77, which in the example shown consist of four suction cups. These are pairwise connected with the arms 76 by means of tube shaped holders 78, which can be displaced in the feeding direction along slits 79 made in the arms 76. Via the holders 78 of tubular shape the suction cups 77 are connected to a common vacuum duct 80, by means of which the suction cups can be subjected to a vacuum during the forward feed of the products, which will be described more in detail below. At the delivery end 16 of the machine a pulley roller 81 is provided for the conveyor band 4, which roller can be adjusted in the longitudinal direction of the machine in order to make possible an adaptation of the machine according to different dimensions of the products, so that the products delivered in their totality will pass the pulley roller 81.

The second embodiment according to the FIGS. 10 and 11 differs from the first one in an essential respect. While in the first embodiment the taking-off device completely follows the movement of the upper clamping piece 72, an additional movement has been introduced in connection with the second embodiment, which movement prolongs the horizontal stroke for the taking-off device compared with the stroke of the clamping piece. The purpose of this arrangement aims at obtaining a better positioning of the finished products in the hopper 17 (FIG. 1). This can be of advantage in connection with certain products and certain hoppers. As was the case in connection with the first embodiment, the taking-off device according to the second embodiment is given its vertical movement and the principal part of its horizontal movement by the upper clamping piece 72, because of which for the additional movement only a simple mechanism and a power organ with short stroke are required.

FIG. 10 emanates from FIG. 8 and from this figure the movable and the fixed clamping device 70 and 75 respectively are found the first one of which exhibiting the horizontally movable clamping piece 71, the horizontally and vertically movable clamping piece 72, and the bar 68 connected with the clamping piece 71 by means of the brackets 83, to which bar the driving means of the feeding device 14 is connected. As is evident from the figures the brackets 83 support a plate 84, the edges of which in sliding manner are mounted in fixed guides 86. The plate supports four piston cylinder units 87 controlled by a pressure medium, the piston rods 88 of said units being connected with guide pieces 89. The guide pieces 89 are attached to bars 90, which in their turn are connected with the upper clamping piece 72. The two bars 91 are in sliding manner mounted in holes in the pairwise positioned guiding pieces 89, which bars together with the end pieces 92 and 93 shaping a frame with holding rules, to which a suitable number of suction cups 77 can be attached by means of their holders 78 and be connected to the vacuum duct 80.

By the arrangement that the bars 91 have been given a sliding mounting in the guide pieces 89, it is possible to let the frame 91-94 with the suction cups 77 perform a horizontal movement of displacement relative to the other mechanism 83-90 driven by the feeding device 14. Such a displacement is carried out by means of the piston cylinder unit 95 controlled by a pressure medium, which unit is attached to the end piece 93, and the piston rod 96 of which is attached to the clamping piece 72. The piston cylinder unit 95 is of course like the piston cylinder units 87 by means of movable ducts for pressure medium connected to a source of pressure medium via suitable controlling organs (not shown).

The taking-off device 15 illustrated in the FIGS. 3 and 4 can substantially be of the same design as the one now described and specified more in detail. However, in connection with the first embodiment the arms 76 corresponding to the clamping rules 94 have no possibility of performing an additional movement relative to the clamping piece 72.

The design of the machine has been described above, and in the following a summing-up of the movements and different positions of the devices forming part of the same during operation will be described. The unrolling device 5 causes the unwinding of the storage rollers 2 by the movement in upwards and downwards direction of the two rollers 20 in cooperation with the change from clamping to releasing position of the clamping device 23. At the same time as the upper clamping piece 25 is lowered to position, the fork shaped stand 19 is lowered, the foil webs 3 thereby passing over the rollers 20 as well as over the roller 22, which brings in its train that a pull is created in the foil web and as consequence an unrolling of the rollers 2 (see the position indicated with dashed and dotted lines in the FIG. 2). At the same time as the stand 19 with the two rollers 20 returns to its upper end position, the clamping piece 25 is raised to a releasing position, and the foil webs 3 are free for being stepwise fed forwards in the machine.

During the stepwise forward feed of the foil webs on the conveyor band 4 the processing of the foil first takes place in the welding press 6, thereafter in the cutting press 7, and the embossing press 8. The stepwise forward feed of the foil webs in this connection is synchronized with the reciprocating movement of the presses in such a manner that the foil webs are kept immovable while the presses are performing their working stroke, the forward feed taking place one step during the return movements of the presses.

In connection with the forward move of the embossing press 8 first the lower clamping rules 53 reach the embossing table 54 and foil webs 3 positioned thereon, as is evident from the FIGS. 5 and 6. Then the piston cylinder units 50 and consequently the upper clamping rules 53 are brought to exhibit a springing action in the supporting yokes 49 by means of the springs 51 for so long a distance that the die 36 reaches the embossing table 54, and after the termination of its embossing action the press performs its return stroke, whereby the lower clamping rules 53 are subjected to the spring action, and consequently the die 36 thus is raised to a level above the clamping rules, which brings in its train that the colour foil 55, which has a tendency to stick to the other foil material and to the die, comes loose, when the lower clamping rules 53 because of the spring action return to the position illustrated in FIG. 5, as the colour foil is kept in tension due to its being clamped between the clamping rules 52, 53. Subsequently the upper clamping rule 52 is brought to return to its releasing position, the colour foil 55 then being driven forwards one step by means of the driving rollers 56.

The stepwise forward feed of the conveyor band 4 and consequently the foil webs 3 is produced by the pivoting movement with the swinging arm 62 of the feeding device 14, which movement is transformed to a reciprocating linear movement of the moveable clamping device 70 (see FIGS. 8 and 9). In this connection a cooperation takes place between the fixed clamping device 73 in such a manner that during the forward movement of the movable clamping device 70 the upper clamping piece 72 is kept lowered in its clamping position at the same time as the upper clamping piece 75 in the fixed clamping device 73 is kept in its releasing position. Due thereto the result then will be that the foil webs 3 as well as the conveyor band 4 are brought forward one step. When the movable clamping device 70 has reached its forward end position in the direction of the forward feed, the fixed clamping device 73 is brought into its clamping position and subsequently the movable clamping device 70 to its releasing position, whereafter the return movement to the starting position illustrated in the FIGS. 8 and 9 takes place, and the cycle is repeated.

At the same time as the foward feed takes place, the taking-off of the finished products from the conveyor band 4 is carried out according to the invention. This can take place because of the taking-off device 15 in the embodiment illustrated in the FIGS. 3 and 4 being rigidly connected with the upper clamping piece 72 of the movable clamping device 70, and because thereof will perform the same reciprocating movement and movement of vertical displacement as said clamping piece. The taking-off device 15 thus is movable between a clamping position (see FIG. 3) and a delivery position. The movement of the taking-off device 15 in this connection shall be adjusted in such a manner that its clamping means 77 in the clamping position will be located right in front of the product occupying a position nearest to the output end 16 of the machine, while the delivery position is adjusted in such a way that the product clamped by the clamping organs 77 will be let loose directly into the hopper 17 located outside of the output end of the machine. In the clamping position the taking-off device 15 is kept lowered against the conveyor band 4 and the product located thereon, so that the clamping organs 77 in the shape of suction cups are lying against the foil, the suction cups being subjected to a vacuum via the vacuum duct 80, which condition maintains during the forward movement of the taking-off device 15, the cut-out product then being displaced outside of the conveyor band 4 to the above mentioned delivery position above the hopper 17. The vacuum condition then is discontinued, the product as a consequence falling down in the hopper 17, and the taking-off device 15 is raised somewhat and returns to the starting position together with the upper clamping piece 72 in the movable clamping device 70. In this connection the taking-off device 15 is lowered against the conveyor band 4, and the cycle is repeated with the one after another forward fed finished products.

Also in connection with the second embodiment of the combined feeding and taking-off device 15 the clamping pieces 71 and 72 perform the previously described horizontal forward feed movement and the clamping piece 72 in addition a vertical clamping movement. The horizontal movement in this case is produced in the same way, as has been described above, by means of the feeding device 14, whereby via the bar 68 and the brackets 83 for one thing the lower clamping piece 71 and for another thing the plate 84 are carried along in the movement, the plate 84 thereby sliding in the guides 86. The guide pieces 89, the bars 90, and the upper clamping piece 72 are then also carried along via the piston cylinder units 87 with the piston rods 88. By actuation of the piston cylinder units 87 the last-mentioned parts can in addition be brought to perform a movement in upwards and downwards direction, which is synchronized with the horizontal reciprocating movement. By this movement the clamping piece 72 thus is given its previously described clamping movement. In this movement also the suction cups 77 take part via the guide pieces 89 and the frame 91–94.

The suction cups 77 also take part in the horizontal movement by means of the connection with the clamping piece 72 constituted by the piston cylinder unit 95 with the piston rod 96. However this piston cylinder unit in connection with products, which require an especially long take-off movement, is controlled to finish its pushing stroke, at the latest when the mechanism is in its outermost position of forward feed, thus the extreme position to the right in the FIGS. 10, 11. Then the piston rod 91 has been projected out of the cylinder 95 and increased in distance between the frame 91–94, and the clamping piece 72, so that the suction cups 77 with the suspended product clinging to them has in comparison with the movement of the clamping piece 72 been displaced for still another distance in outwards direction above the hopper 17 (to the right in the FIGS. 10, 11). The connection with the return movement (to the left), when the suction cups 77 are inactivated and the clamping piece 72 and the upper mechanism belonging to the same for the rest by the displacing movement of the piston cylinder units 87 are in their upper position, the piston cylinder unit 85 by the controlling means is brought to perform a pulling movement substantially synchronously with the return movement of the clamping device 70. Then the frame 91–94 resumes its normal position close to the clamping piece 72.

If the additional movement is not required, the piston cylinder unit 95 can be set in a fixed position, whereby the mechanism gets the same way of working, as has been described in connection with the FIGS. 3 and 4.

In the description above one portion of the foil webs 3 for clarity's sake has been followed during its passage through the whole machine. However, it must be pointed out that all of the above mentioned working operations are taking place parallelly and during the period of time required for performing one single step of the forward feed of the conveyor band 4.

The hopper in the example shown is located in the prolongation of the machine at its output end, but it can also be imagined to have it located at one longitudinal side at the output end of the machine, in which connection a sidewise take-off movement is required, whereby the arms of the taking-off device suitably can be given a pivoting movement.

It is further imaginable that the feeding unit is driven by a driving means working in linear direction, by way of example a piston cylinder unit. One can also imagine that the clamping organs of the type illustrated can be substituted by carriers of another type, which can carry along and deposit the products.

It is claimed:

1. An apparatus for the transportation of objects formed of sheet material produced from foil webs thereof moving stepwise in a forward direction from a feed station to a discharge station at the end of a conveyor band, comprising a first power means, feeding means for providing stepwise forward movement of the conveyor band and the objects supported thereby, said feeding means, including a clamping device having upper and lower clamping elements adapted to retain said objects on the conveyor band and release same therefrom; said clamping device being moveable in said forward direction and returnable to a predetermined feeding position by said first power means connected thereto, a second power means connected to said clamping device to lower said upper clamping element for movement in the forward direction and elevate said element during its movement in the return direction, discharge means to remove said objects from the conveyor band at said discharge station, said discharge means comprising carrying means connected to said upper clamping element and moveable therewith in the same directions as the latter, said carrying means being provided with suction cups for engaging said objects on the conveyor when moving in the forward direction, means communicating said suction cups with a source of vacuum during said forward movement and disconnecting same from said source when in a position to discharge said objects, said suction cups being disposed to secure each successive object as it nears the end of the conveyor band in stepwise movement while said upper clamping element and suction cups are in a lowered position, and to release each object beyond the end of the conveyor and, at which point said suction cups are elevated with said upper clamping element and returned to a position for feeding another object in the forward direction.

2. An apparatus according to claim 1, wherein said carrying means comprises a moveable support forming an arm connected to said upper clamping element and projecting longitudinally in the forward direction of said conveyor band, said arm being provided with said suction cups, whereby the arm extends beyond the end of the conveyor band upon reaching a position to discharge said objects.

3. An apparatus according to claim 1, wherein said carrying means comprises a carriage moveably connected to said upper clamping element by means of a third power means adapted to extend said carriage beyond the end of the conveyor band in the forward direction during forward movement of said clamping device, said carriage being provided with said suction cups above said conveyor band to successively retain and release the objects carried thereby.

* * * * *